(12) United States Patent
Cao et al.

(10) Patent No.: US 10,791,418 B2
(45) Date of Patent: Sep. 29, 2020

(54) METHOD AND SYSTEM FOR MODELING USER AND LOCATION

(71) Applicant: Bayerische Motoren Werke Aktiengesellschaft, Munich (DE)

(72) Inventors: Yang Cao, Chicago, IL (US); Jilei Tian, Chicago, IL (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/400,568

(22) Filed: May 1, 2019

(65) Prior Publication Data
US 2019/0342698 A1 Nov. 7, 2019

(30) Foreign Application Priority Data
May 7, 2018 (EP) .................................... 18170964

(51) Int. Cl.
*H04W 24/00* (2009.01)
*H04W 4/021* (2018.01)
*G06F 17/16* (2006.01)
*G06N 7/00* (2006.01)

(52) U.S. Cl.
CPC ............ *H04W 4/021* (2013.01); *G06F 17/16* (2013.01); *G06N 7/005* (2013.01)

(58) Field of Classification Search
CPC ........ H04W 4/021; G06F 17/16; G06N 7/005
USPC ............................................ 455/456.1, 404.2
See application file for complete search history.

(56) References Cited

U.S. PATENT DOCUMENTS

| 8,762,302 | B1 * | 6/2014 | Spivack | G06N 5/046 706/12 |
| 8,983,494 | B1 * | 3/2015 | Onnen | H04W 4/021 455/456.1 |
| 9,237,543 | B2 * | 1/2016 | Karr | G01S 1/026 |
| 9,282,161 | B1 * | 3/2016 | Hill | H04L 67/306 |

(Continued)

FOREIGN PATENT DOCUMENTS

WO   WO 2013/107669 A1   7/2013

OTHER PUBLICATIONS

Extended European Search Report issued in counterpart European Application No. 18170964.3 dated Sep. 13, 2018 (nine (9) pages).

(Continued)

*Primary Examiner* — Marceau Milord
(74) *Attorney, Agent, or Firm* — Crowell & Moring LLP

(57) ABSTRACT

A method and system for determining a preference of a user for a location is provided. The preference of the user for the location is determined based on a plurality of users and a plurality of locations. The method includes determining a user-location relation based on a plurality of relations of the users with the locations, determining a plurality of POItags indicative of one or more properties of the plurality of locations, and determining a user-POItag relation based on the plurality of users and the plurality of POItags. The method also includes determining a location-POItag relation based on the plurality of locations and the plurality of POItags, and determining the preference of the user for the location based on at least one of the user-location relation, the user-POItag relation, and the location-POItag relation. The system includes a controller configured to perform the method. A vehicle including the system is also provided.

16 Claims, 4 Drawing Sheets

(56) References Cited

U.S. PATENT DOCUMENTS

| | | | |
|---|---|---|---|
| 9,369,988 B1* | 6/2016 | Johnson | H04W 4/10 |
| 9,516,467 B1* | 12/2016 | Cronin | H04W 4/023 |
| 9,710,873 B1* | 7/2017 | Hill | G06T 1/20 |
| 9,774,696 B1* | 9/2017 | Calvert | H04L 67/26 |
| 2004/0198386 A1* | 10/2004 | Dupray | H04W 64/00 |
| | | | 455/456.1 |
| 2007/0287473 A1* | 12/2007 | Dupray | H04W 4/029 |
| | | | 455/456.1 |
| 2008/0301727 A1* | 12/2008 | Cristofalo | G06Q 30/02 |
| | | | 725/35 |
| 2010/0030578 A1* | 2/2010 | Siddique | G06Q 20/204 |
| | | | 705/3 |
| 2010/0156933 A1* | 6/2010 | Jones | G06Q 30/02 |
| | | | 345/629 |
| 2011/0010364 A1 | 1/2011 | Ahtisaari et al. | |
| 2011/0238517 A1* | 9/2011 | Ramalingam | H04W 4/029 |
| | | | 705/26.1 |
| 2011/0302124 A1* | 12/2011 | Cai | G06F 16/353 |
| | | | 706/52 |
| 2011/0302162 A1* | 12/2011 | Xiao | G06F 16/29 |
| | | | 707/724 |
| 2012/0036015 A1* | 2/2012 | Sheikh | G06Q 30/02 |
| | | | 705/14.54 |
| 2012/0058775 A1* | 3/2012 | Dupray | G01S 5/0257 |
| | | | 455/456.1 |
| 2013/0124449 A1* | 5/2013 | Pinckney | G06N 5/048 |
| | | | 706/52 |
| 2013/0268357 A1* | 10/2013 | Heath | H04L 63/00 |
| | | | 705/14.53 |
| 2013/0290106 A1* | 10/2013 | Bradley | G06Q 90/20 |
| | | | 705/14.64 |
| 2014/0052527 A1* | 2/2014 | Roundtree | G06Q 30/0245 |
| | | | 705/14.44 |
| 2014/0074639 A1* | 3/2014 | Tian | G06Q 30/0631 |
| | | | 705/26.1 |
| 2014/0129331 A1* | 5/2014 | Spivack | G06Q 30/0269 |
| | | | 705/14.53 |
| 2014/0278992 A1* | 9/2014 | Roundtree | G06Q 30/0257 |
| | | | 705/14.55 |
| 2014/0279727 A1* | 9/2014 | Baraniuk | G06N 20/00 |
| | | | 706/11 |
| 2014/0297617 A1* | 10/2014 | Rajakarunanayake | G06F 16/29 |
| | | | 707/709 |
| 2014/0297669 A1* | 10/2014 | Rajakarunanayake | G06F 16/9537 |
| | | | 707/756 |
| 2014/0370844 A1* | 12/2014 | Lara | H04W 4/21 |
| | | | 455/405 |
| 2016/0210602 A1* | 7/2016 | Siddique | G06Q 20/0453 |
| 2016/0316325 A1* | 10/2016 | Sadr | H04W 4/027 |
| 2018/0165554 A1* | 6/2018 | Zhang | G06K 9/6256 |
| 2019/0303807 A1* | 10/2019 | Gueye | G06Q 10/02 |

OTHER PUBLICATIONS

Zheng Y. et al.,"Mining Interesting Locations and Travel Sequences from GPS Trajectories", Microsoft Research Asia, Apr. 20, 2009, pp. 791-800, XP58025650, Madrid, Spain (10 pages).

* cited by examiner

| GPS | Score | Location |
|---|---|---|
| 41.384469, -87.937838 | 0.291211 | Location 1 |
| 41.535174, -87.346572 | 0.039509 | Location 2 |
| 42.948464, -88.839604 | 0.021999 | Location 3 |
| 41.107496, -87.172102 | 0.016911 | Location 4 |
| 48.851365, 11.137009 | 0.015756 | Location 5 |
| 41.203333, -87.129156 | 0.015506 | Location 6 |

| User ID | Score |
|---|---|
| ......8c44695c | 0.047968 |
| ......e49177a8 | 0.036055 |
| ......460a2052 | 0.025696 |
| ......0ac213df | 0.022578 |
| ......95c342f9 | 0.021743 |
| ......6b6b6223 | 0.020511 |
| ......bcd9c8cc | 0.017568 |

METHOD AND SYSTEM FOR MODELING USER AND LOCATION

CROSS REFERENCE TO RELATED APPLICATION

This application claims priority under 35 U.S.C. § 119 from German Patent Application No. 18170964.3, filed May 7, 2018, the entire disclosure of which is herein expressly incorporated by reference.

BACKGROUND AND SUMMARY OF THE INVENTION

The present disclosure relates to a method and system for modeling user and location, in particular for use in a location-based services environment. In a preferred embodiment, there is provided a method and system for modeling user and location for use in a location-based recommendation service.

Location-based services (LBS) have become highly relevant in many application domains, in particular with respect to automotive digital services. An effective and efficient use of location-based services can very much benefit from proper modeling of users and location, as well as of relations between users and locations.

"User modeling for point-of-interest recommendations in location-based social networks: the state-of-the-art", Shudong Liu, School of Information & Security Engineering, Zhongnan University of Economics & Law, Wuhan 430073, China, describes that the rapid growth of location-based services has greatly enriched people's urban lives and attracted millions of users in recent years. Location-based social networks (LBSN) allow users to check-in at a physical location and share daily tips on points-of-interest (POI) with other users. Such check-in behavior can make daily real-life experiences spread quickly through the Internet. Moreover, such check-in data in LBSNs can be exploited to understand the basic laws of humans' daily movement and mobility. The author focuses on reviewing the taxonomy of user modeling for POI recommendations through the data analysis of LBSNs. The structure and data characteristics of LBSNs is introduced, then a formalization of user modeling for POI recommendations in LBSNs is presented. Depending on which type of LBSNs data was fully utilized in user modeling approaches for POI recommendations, user modeling algorithms can be divided into four categories: pure check-in data-based user modeling, geographical information-based user modeling, spatio-temporal information-based user modeling, and geo-social information-based user modeling. The author mentions that spatial clustering results from users' tendency to visit nearby places rather than distant ones in their daily lives, thereby generating clusters containing different visited locations within that same cluster. This may make it difficult to reliably identify single locations visited by a user.

"Mining Interesting Locations and Travel Sequences from GPS Trajectories", Yu Zheng, et al., Microsoft Research Asia, WWW 2009, Apr. 20-24, 2009, Madrid, Spain, proposes a hypertext-induced topic search based inference model, which regards an individual's access on a location as a directed link from the user to that location. This model infers the interest of a location by taking into account the three factors: the notion that the interest of a location depends not only on the number of users visiting the location but also the users' travel experiences; the notion that users' travel experiences and location interests have a mutual reinforcement relationship; and the notion that the interest of a location and the travel experience of a user are relative values and are region-related. The authors have not, however, studied the algorithm framework in the semantic space that can bring not only improvements with respect to interpretation, but user and location into the same measurable space for computation, for example regarding a similarity for location recommendations, user and location profiling that are fundamental for smart location based service.

For the application domain of automotive digital services, the visits of a user to a certain location play an important role. Thus, it would be beneficial if the general relationship between user and location could be determined across a large set of users and locations, and if the user and location could be scored as user and location profiles.

Therefore, there is a need for an efficient and effective algorithm for achieving user and location scoring that can be used, for example, in smart location mining and recommendation, gamification, and for user and location profiles.

In particular, there is a need for an algorithm modeling framework that allows to bring both user and location into the measurable semantic space.

One or more of the objects specified above are substantially achieved by methods and system for modeling user and location in accordance with any one of the appended claims, which alleviate or eliminate one or more of the disadvantages described above and which realize one or more of the aforementioned advantages.

According to the invention, there is provided a method for determining a preference of a user for a location. The method includes determining a user-location relation based on a plurality of relations of a plurality of users with a plurality of locations, determining a plurality of POItags indicative of one or more properties of the plurality of locations, determining a user-POItag relation based on the plurality of users and the plurality of POItags, determining a location-POItag relation based on the plurality of locations and the plurality of POItags, and determining the preference of the user for the location based on at least one of the user-location relation, the user-POItag relation, and the location-POItag relation.

In a preferred embodiment, determining the user-POItag relation and/or determining the location-POItag relation is based on a probabilistic matrix factorization model.

In a preferred embodiment, the method further includes determining the locations based on a clustering of a plurality of geolocations. In some embodiments, each geolocation of the plurality of geolocations is indicative of a visit of a user of the plurality of users to a location of the plurality of locations.

In a preferred embodiment, each relation of the plurality of relations of the users with the locations is determined based on a visit of a user of the plurality of users to a location of the plurality of locations. In some embodiments, the visit is determined based on $r_{i,j}=f(\text{visit\_count}(u_i, 1_j))$. The visit_count represents a number of visits of the user to the location.

In a preferred embodiment, the plurality of users, the plurality of locations, and/or the plurality of POItags include latent factors. The latent factors may be represented in semantic space.

In a preferred embodiment, the relation of a user with respect to a location is determined as $r_{ij}=u_i^T \times l_j$.

In a preferred embodiment, the method further includes normalizing parameter values indicative of each user of the plurality of users and/or normalizing parameter values indicative of each location of the plurality of locations. Normalizing may be based on the following compression function: $f(x)=\sqrt{x}$.

In a preferred embodiment, one or more of the following steps: determining a plurality of POItags indicative of one or more properties of the plurality of locations, determining a user-POItag relation based on the plurality of users and the plurality of POItags, and determining a location-POItag relation based on the plurality of locations and the plurality of POItags, which is based on an estimation algorithm that is convex optimizable. The determining may be performed in semantic space.

According to the invention there is further provided a system for determining a preference of a user, the system including a control unit configured for performing the method in accordance with the present invention.

According to the invention there is further provided a vehicle including the system according to the present disclosure.

Other objects, advantages and novel features of the present invention will become apparent from the following detailed description of one or more preferred embodiments when considered in conjunction with the accompanying drawings.

BRIEF DESCRIPTION OF THE DRAWINGS

The accompanying drawings disclose exemplifying and non-limiting aspects in accordance with embodiments of the present invention.

DETAILED DESCRIPTION OF THE DRAWINGS

Proper modeling of users and locations is key to providing relevant location based services. Within this disclosure, point of interest (POI) tags are applied to individual locations in order to illustrate a users' interest and to provide structure to a location's profile. A profile is a collection of data indicative of properties of an entity, for example a user or location. The methods and systems disclosed herein propose a novel approach to modeling user and location, incorporate relationships between users and POItags as well as between locations and PIO-tags, employing user-location matrix in collaborative filtering to establish a user location modeling framework.

When planning to visit a certain place, users typically select a corresponding POI or address in order to identify the place in terms of navigation and destination management. Therefore, it can be assumed that users have or can easily accumulate a collection of POItags and/or addresses from navigation and destination management (e.g. from a navigation system in a vehicle or a corresponding app running on a mobile device) which can be used to reveal the users' interests over time. Simultaneously, locations can be provided with POItags, for example by a map provider or from different users (e.g. crowdsourcing). Such POItags can be used as input for a location's profile.

Therefore, there are several data sets available for processing: user (interest) profiles, location profiles, and the modeling of respective relationships. An exemplary use case benefits from such data sets in that user-POItag and location-POItag relationships (i.e. matrixes) can be employed in a recommendation system. For example, a user may define a type of place they intend to visit and the methods and systems disclosed herein can be used in order to provide the user with a corresponding recommendation.

Figure 1:
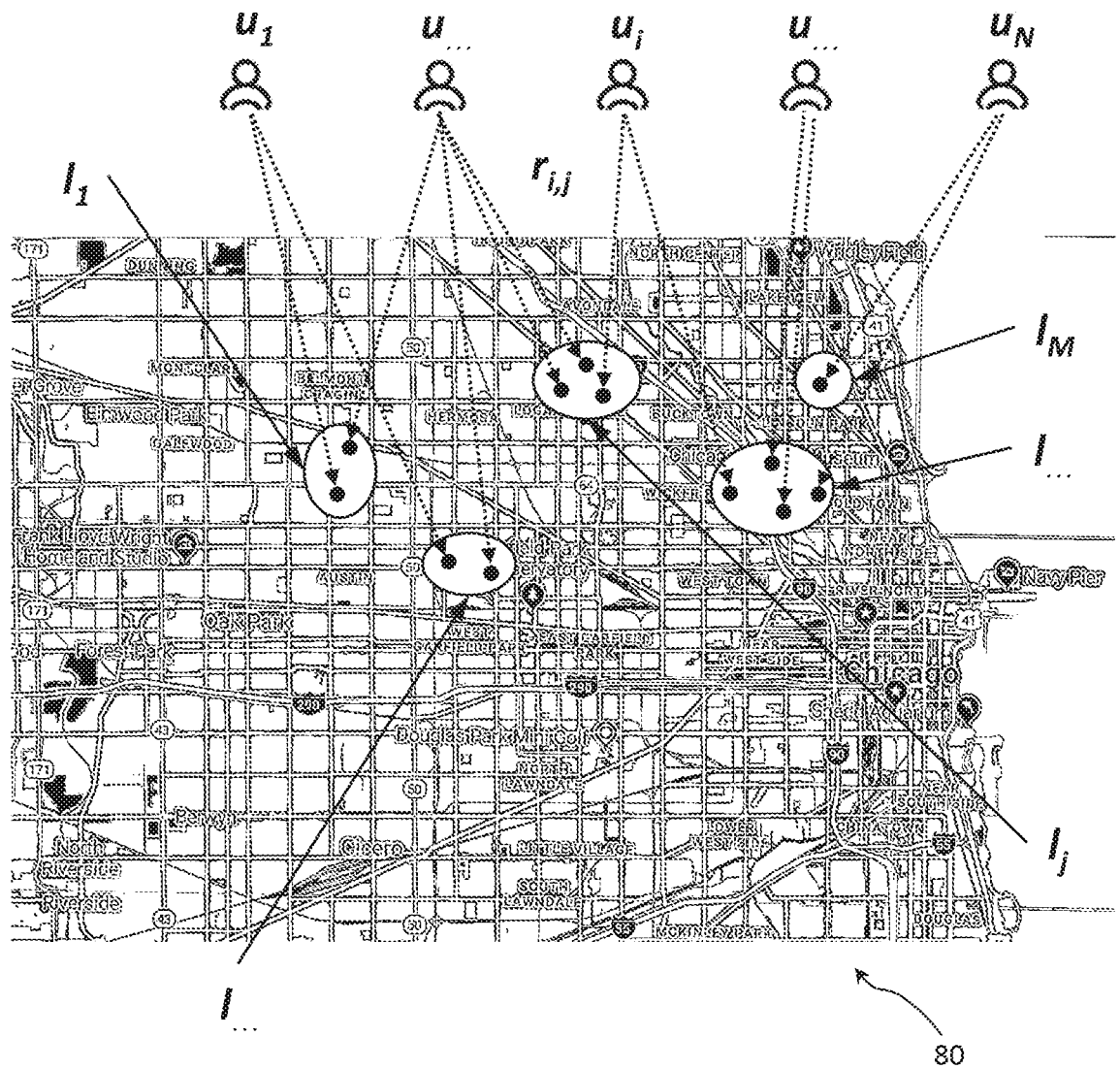
FIG. 1 is an illustration of clustering of locations based on user visits in accordance with embodiments of the present invention.

FIG. 1 illustrates clustering of locations based on user visits in accordance with embodiments of the present invention. FIG. 1 shows a set of N user visits u1, u . . . , ui, u . . . , $u_N$ to a set of M locations l1, 1 . . . , lj, 1 . . . , $l_M$, where each location l1, 1 . . . , lj, 1 . . . , $l_M$ includes one or more user visits. It is noted that the user visits u1, u . . . , ui, u . . . , uN do not have to be visits to identical geographical locations (or geolocations), for example due to the fact that several user visits to the same location (e.g. a shopping mall) do not necessarily entail that a user has visited the exact same geolocation (e.g. parking garage or parking spot) each time. It is a common occurrence that a user may park their car at different places near the location even though the location is the destination for all the respective visits. In the example of the shopping mall it is, furthermore, very likely that the user intends to visit different places within the mall (e.g. stores, restaurants, movie theatres), such that all these visits pertain to the same location (i.e. the mall) even though there is a different context each time.

In a first step, a clustering algorithm is applied in order to determine significant locations from a set of locations 1 visited by users u over a period of time. In some embodiments, density-based clustering is used. In density-based clustering, clusters may be defined as areas of higher density than a remainder of a data set. Elements located in sparsely populated areas, which are necessary to separate different clusters, may be considered noise or border points. It is noted that other clustering methods or algorithms are applicable. As a result several clusters can be determined, denoting (relatively small) areas containing a number of visited geolocations, without the necessity of these geolocations to be identical.

Next, a user and location interaction matrix R is built as:

$$ri,j=f(\text{visit\_count}(user_i, location_j)).$$

Here, f is a monotonic function (e.g. a linear function f(x)=x). In order to avoid users showing a large number of visits being overly dominant with respect to other users in the data set, a compression function can be applied. In one example the compression function is defined as $f(x)=\sqrt{x}$.

Subsequently, a user experience score, i.e. a score indicative of the experience of a user u with respect to a location l, is determined based on a geolocation and location significance score, i.e. a combined score of a user and that of a location. A user score vector may be denoted as $u=u_1 \ldots u_N$ across N users and a location score may be denoted as $l=l_1 \ldots l_M$ across M locations. The vector $u^o$ can be initialized as $$u^0 = \begin{bmatrix} \frac{1}{N} & \cdots & \frac{1}{N} \end{bmatrix}.$$

Therefore, for the n-th iteration:

$$l^n = u^{n-1} \cdot R \text{ and}$$

$$u^n = l^n \cdot R^T$$

The iteration is terminated if $|u^n - u^{n-1}| \varepsilon$.

Using merely POItag data in order to semantically describe a given location may introduce ambiguity in some case, since users may make use of different POItags in connection with a single location. The POItag includes, for example, the geolocation region information (e.g. city, state and country) due to the high relevance within the application domain as a proven way to identify certain locations. Further, POItags may also include category information (e.g. restaurant, shopping, recreational). It is noted that a score, both for a user or a location, may be provided with a factor or function indicative of a decay. In some applications, relevance of a user score or a location score may be rather short-lived (e.g. users change their behavior and/or locations being visited less frequently). In such applications, it is desirable to let scores decay over time in order to quickly adapt to changing situations.

So-called latent factors can be used to represent user, location, and POItag. Each factor can be a topic that can illustrate the user's preference, location profile, or POItag's semantic meaning, all in latent but semantic space. Latent variables, as opposed to observable variables, are variables that are not directly observed but are rather inferred through a mathematical model from other variables that are observed or directly measured. Machine learning models that aim to explain observed variables in terms of latent variables are called latent variable models. Those variables can be semantically measurable using a suitable distance measure in the latent space. Therefore, variables having similar semantics are close to one another, in terms of the selected distance measure, in the latent space. By incorporating the POItag into the latent factor model, POItags can be used to reveal a factor's semantic meaning.

Figure 2:
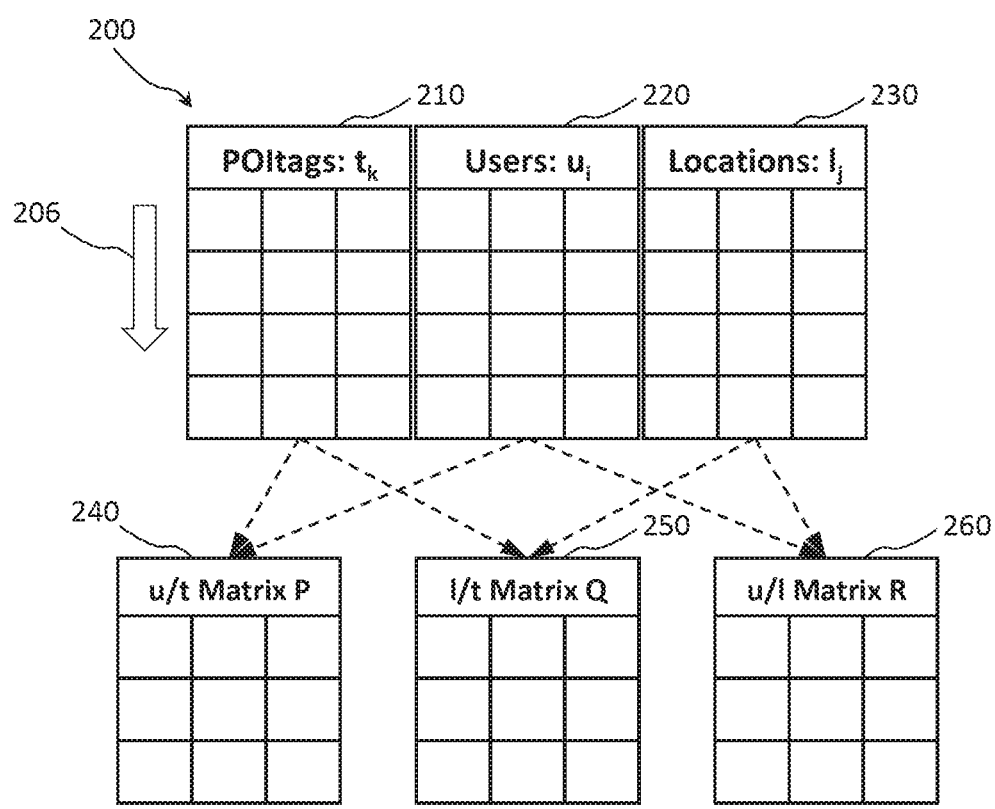
FIG. 2 is an illustration of modeling of user and location in accordance with embodiments of the present invention.

FIG. 2 shows modeling of user and location in accordance with embodiments of the present invention. FIG. 2 illustrates an exemplary method of generating matrixes 240, 250, 260 from tables 210, 220, 230 containing the corresponding vectors representing the respective POItag, user, or location data. Users, locations, and POItags are all transformed into the same latent space, thus a similarity between a pair of any two elements can be measured or quantified. Latent factors 260 can be interpreted with POItags. Human users are typically not able or willing to understand/interpret the value of a latent variable in the latent space. However, human users can understand a POItag. For example, a POItag such as: [Citi, Bank, Money, Insurance, J. P. Morgan, Cash, Interest, Stock], strongly suggests, to a human user, a financial context.

Table 210 contains POItags Tk, table 220 contains users Ui, and table 230 contains locations Lj. The concept includes applying collaborative filtering in order to determine matrixes 240, 250, and 260 from tables 210, 220, and 230. "Collaborative Filtering with User Ratings and Tags", Tengfei Bao, Yong Ge, Enhong Chen, Hui Xiong, Jilei Tian, which is incorporated herein by reference in its entirety, describe a collaborative filtering model based on probabilistic matrix factorization in order to determine predict users' interests to items by simultaneously utilizing both tag and rating information. This method can be applied in the present example. It is noted that the article mentions "latent features" instead of "latent factors" as used in the present disclosure. These terms are used interchangeably as they refer to the same identical concept. Using the method, a low-rank approximation for three matrices is performed at the same time to learn the low-dimensional latent factors of users, items, and tags. Then, one user's preference to an item is predicted as the product of the user and item latent factors. It has been shown that the proposed method can significantly outperform benchmark methods, which is beneficial in the present application domain.

Figure 3:
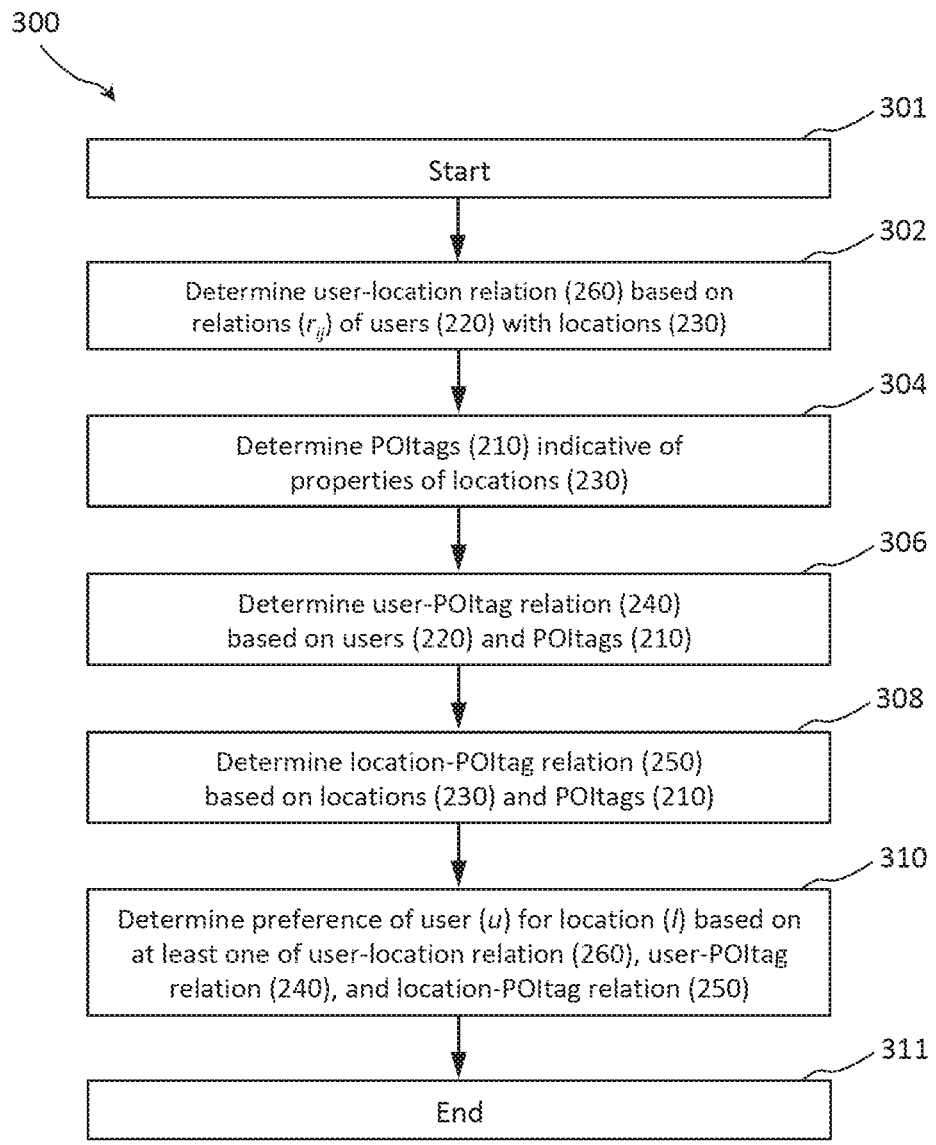
FIG. 3 is a flow chart of an exemplary process for user location modeling in accordance with embodiments of the present invention.

FIG. 3 shows a flow chart of an exemplary process 300 for user location modeling in accordance with embodiments of the present invention. Process 300 starts at step 301. In step 302 a user-location relation 260 is determined based on a plurality of relations rij of a plurality of users 220 with a plurality of locations 230. In step 304, a plurality of POItags 210 indicative of one or more properties of the plurality of locations 230 is determined. In step 306, a user-POItag relation 240 is determined based on the plurality of users 220 and the plurality of POItags 210. In step 308, a location-POItag relation 250 is determined based on the plurality of locations 230 and the plurality of POItags 210. In step 310, the preference of the user u for the location l is determined based on at least one of the user-location relation 260, the user-POItag relation 240, and the location-POItag relation 250. The process ends at step 311.

Generally, user and location are represented with POItag distributions, for example:

User u: POItag 1: 20, POItag 2: 30, . . . .
Location l: POItag 1: 0, POItag 2: 100, . . . .

The respective values may be normalized in order to project the values into a common interval (e.g. [0-1.0]), for example:

User u: POItag 1: 0.02, POItag 2: 0.03, . . . .
Location l: POItag 1: 0, POItag 2: 0.07, . . . .

Further, user-POItag, location-POItag, and user-location relationships may be modeled within a probabilistic matrix factorization model. The user, location, and POItag are in semantic spaces, and the user-POItag, location-POItag, and user-location matrix are generated as the inner product in semantic space. In particular, the user and location on POItag space are the projections from semantic space.

One or more of determining the plurality of POItags 210 indicative of one or more properties of the plurality of locations 230, determining the user-POItag relation 240 based on the plurality of users 220 and the plurality of POItags 210, and determining the location-POItag relation 250 based on the plurality of locations 230 and the plurality of POItags 210, may be based on an estimation algorithm that is convex optimizable. One option for an estimation algorithm includes estimating one parameter while keeping other parameters fixed, in order to arrive at a convex optimizable problem. The relation rij of a user ui with a location lj is determined as $r_{ij} = u^T \times l_j$. The meaning of each dimension in semantic space is that both user and location are transformed into latent space, such that a distance or relevancy between them can be measured using the selected distance measure (see above). Here, each dimension is represented by a corresponding latent variable. In order to interpret the semantic meaning dimensional z, the top k POItags in that semantic space dimensional can be used.

Figures 4, 5, 6:
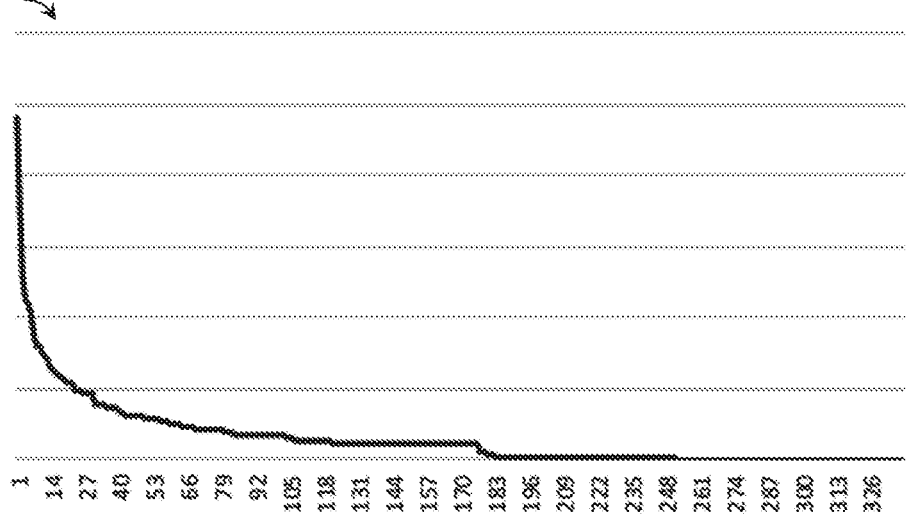
FIG. 4 is a table illustrating example location scores determined in accordance with embodiments of the present invention.
FIG. 5 is a table illustrating example user scores determined in accordance with embodiments of the present invention.
FIG. 6 is a diagram illustrating a distribution of example user scores determined in accordance with embodiments of the present invention.

FIG. 4 shows a table 400 illustrating example location scores determined in accordance with embodiments of the present invention. In order to illustrate an example of user and location scores determined in accordance with the present invention, user and location scoring (in the example without POItag and collaborative filtering) has been performed on test data acquired over time. The scoring has been performed on a total number of 11,820 data points from a total of 337 users. Data points were collected based on locations visited by the users by car. In preprocessing, special locations, such as a user's home location, have been removed. Density clustering (algorithm: optics) with a cluster size of 300 m and a cluster density of visits from at least 4 users has been performed. After clustering, the user-location matrix R has been prepared and, subsequently, user and location scores have been determined based on the iterative algorithm described above. As can be seen from table 400, the locations having the top 6 scores already show significant differences between individual scores. Location 1, for example, has a score nearly a magnitude greater than location 2. In this example, location 1 corresponded to the location of the joint work place of most of the test user, so that the high score of location 1 has been correctly determined as being of very high relevance for this particular test group of users. With a bigger and more heterogeneous user group, such outliers should occur relatively rarely.

FIG. 5 shows a table 500 illustrating example user scores determined in accordance with embodiments of the present invention. Similar to determining location scores, user scores have been determined based on the same test data as described above with respect to FIG. 4 and table 400. From table 500, it can be seen that scores of individual users differ less than those of the locations shown in table 400. This is due to even a small test group of users already offering a wide variety of visited locations without a clear bias, except in cases of very homogeneous groups. Both tables 400 and 500 in combination allow for a very reliable recommendation of locations to users, based on user and location scores.

FIG. 6 shows a diagram 600 illustrating a distribution of example user scores determined in accordance with embodiments of the present invention. As can be seen from diagram 600, about 10% of users exhibit a significantly higher score than the remaining 90% of users. Combining the user and location scores in order to provide recommendations, thus, allows for experienced users and popular locations (i.e. respectively those having high scores) to be prioritized over others having lower scores.

In accordance with the present invention, it is, thus, very easy to determine a similarity of users across locations and, likewise, a similarity of locations across the users. Based on a similarity matrix so generated, the recommendation can be determined and users can be provided with a suggestion to visit locations preferred by similar users. Further, a user score can be used for gamification. For example, an opinion leader or other important user (e.g. a local person as compared to a visitor) will typically exhibit a high score, due to frequent visits to locations within a region, effectively making that person an expert user for the region.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining a preference of a user for a location, the method comprising the acts of:
    determining a user-location relation based on a plurality of relations of a plurality of users with a plurality of locations;
    determining a plurality of POItags indicative of one or more properties of the plurality of locations;
    determining a user-POItag relation based on the plurality of users and the plurality of POItags;
    determining a location-POItag relation based on the plurality of locations and the plurality of POItags; and
    determining the preference of the user for the location based on at least one of the user-location relation, the user-POItag relation, and the location-POItag relation, wherein
    the relation ($r_{ij}$) of the user ($u_i$) with the location ($l_j$) is determined based on: $r_{ij}=u^T \times l_j$, where $r_{i,j}$ represents a user and location interaction matrix.

2. The method according to claim 1, wherein the determining the user-POItag relation and/or the determining the location-POItag relation is based on a probabilistic matrix factorization model.

3. The method according to claim 1, further comprising: determining the locations based on a clustering of a plurality of geolocations.

4. The method according to claim 3, wherein each geolocation of the plurality of geolocations is indicative of a visit of a user of the plurality of users to a location of the plurality of locations.

5. The method according to claim 4, wherein each relation of the plurality of relations of the plurality of users with the plurality of the locations is determined based on a visit of a user of the plurality of users to a location of the plurality of locations.

6. The method according to claim 5, wherein the visit is determined based on:
    $r_{i,j}=f(\text{visit\_count}(u_i, l_j))$, where
    $r_{i,j}$ represents a user and location interaction matrix, and visit_count represents a number of visits of the user ($u_i$) to the location ($l_j$).

7. The method according to claim 6, wherein the relation ($r_{ij}$) of the user ($u_i$) with the location ($l_j$) is determined based on: $r_{ij}=u^T \times l_j$, where $r_{i,j}$ represents a user and location interaction matrix.

8. The method according to claim 1, wherein each relation of the plurality of relations of the plurality of users with the plurality of the locations is determined based on a visit of a user of the plurality of users to a location of the plurality of locations.

9. The method according to claim 1, wherein the plurality of users, the plurality of locations, and/or the plurality of POItags include latent factors.

10. The method according to claim 9, wherein the latent factors are represented in semantic space.

11. The method according to claim 1, further comprising: normalizing parameter values indicative of each user of the plurality of users and/or normalizing parameter values indicative of each location of the plurality of locations.

12. The method according to claim 11, wherein the normalizing is based on a compression function: $f(x)=\sqrt{x}$.

13. The method according to claim 1, wherein one or more of the following acts are based on an estimation algorithm that is convex optimizable:
    the determining the plurality of POItags indicative of the one or more properties of the plurality of locations;
    the determining the user-POItag relation based on the plurality of users and the plurality of POItags; and the determining the location-POItag relation based on the plurality of locations and the plurality of POItags.

14. The method according to claim 13, wherein the determining is performed in semantic space.

15. A system for determining a preference of a user for a location, comprising:
a controller configured for performing the method according to claim 1.

16. A vehicle comprising:
a system according to claim 15.

* * * * *